UNITED STATES PATENT OFFICE.

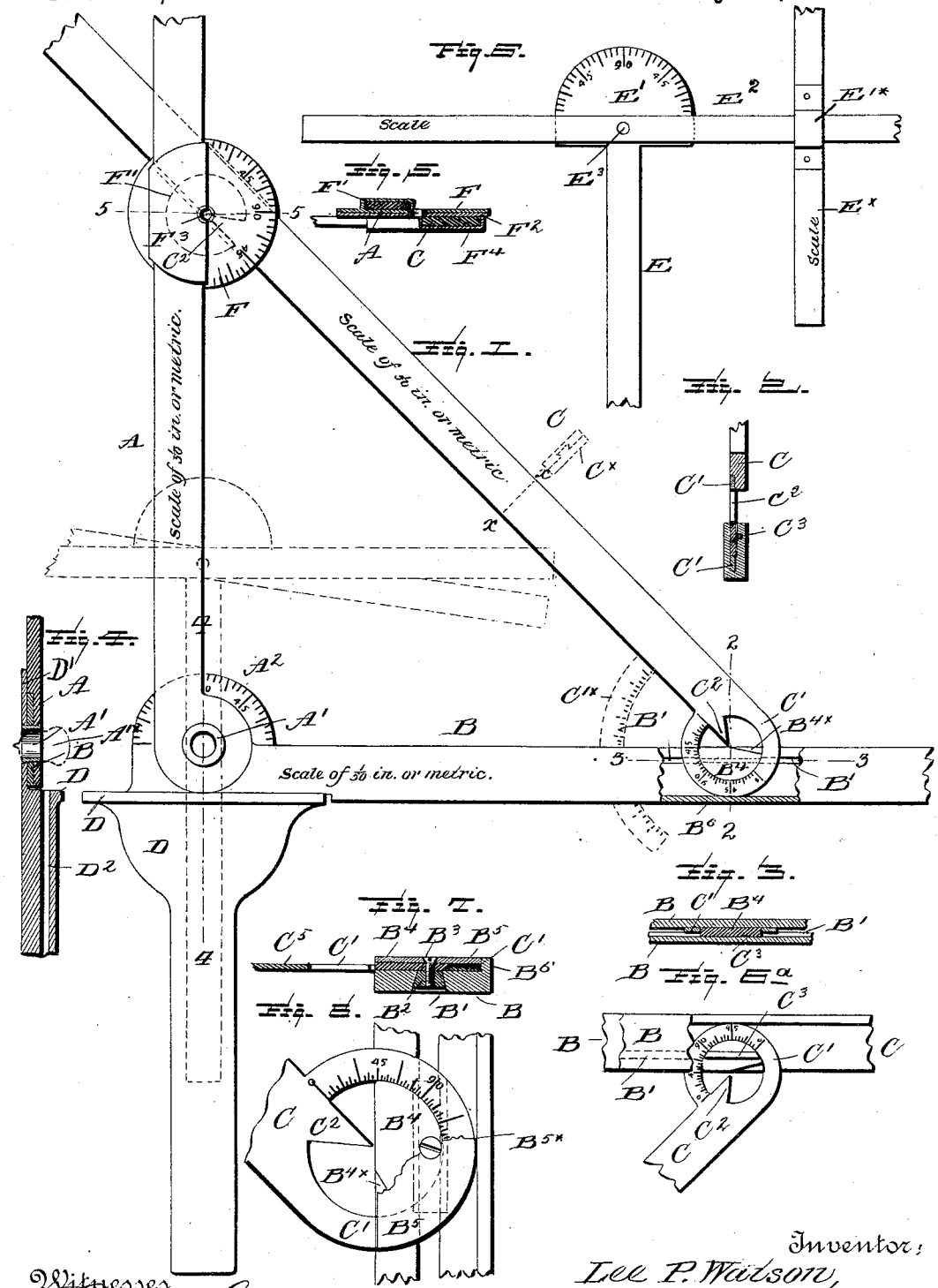

LEE P. WATSON, OF FAIRMONT, WEST VIRGINIA.

PLOTTER.

SPECIFICATION forming part of Letters Patent No. 479,198, dated July 19, 1892.

Application filed August 20, 1891. Serial No. 403,222. (No model.)

*To all whom it may concern:*

Be it known that I, LEE P. WATSON, a citizen of the United States, residing at Fairmont, in the county of Marion, State of West Virginia, have invented certain new and useful Improvements in Protractors, of which the following is a specification, reference being had therein to the accompanying drawings.

This invention has relation to a plotting-instrument, which may be designated by the name "triangleometer," as its fundamental purpose is the measurement of the sides and angles of triangles and of the areas thereof, and this without any mathematical calculation or demonstration except such as can be mentally performed.

The instrument will show at a glance, merely by reading the scales thereon, first, all sides in length of a triangle to which it is adjusted; second, all angles of any triangle; third, the altitude of any triangle, and hence its area, by a simple and generally mental calculation. It also materially assists in a vast proportion of the work of plotting—for example, supplying a hypotenuse in measuring height, depth, and distances through inaccessible territories, determining correctness of drafting in plots—and in a large range of work not necessary to be mentioned, but falling to the lot of surveyors and civil engineers.

Further objects and advantages of the invention will appear in the following description, and the novel features thereof will be particularly pointed out in the claims.

Figure 1 represents in plan a triangleometer embodying my invention. Fig. 2 is a transverse section on the line 2 2 of Fig. 1. Fig. 3 is a longitudinal section on the line 3 3 of Fig. 1. Fig. 4 is a section on the line 4 4 of Fig. 1, and Fig. 5 is a section on the line 5 5 of Fig. 1. Fig. 6 is a plan of an attachment for constructing lines parallel with any side of the triangle to which the main instrument is adjusted. Fig. 6$^a$ is a bottom plan view of the sliding joint shown in sections in Figs. 2 and 3. Fig. 7 is a modification of this joint on an enlarged scale. Fig. 8 is a plan of the modified joint shown in section in Fig. 7.

Like letters of reference refer to like parts in all the figures.

The principal elements of my triangleometer comprise three arms, A, B, and C, which for convenience in description I will designate as the "perpendicular," "base," and "hypotenuse," respectively, although it is understood that either arm may be employed in representing either of these sides of a triangle. The arms A and B are pivotally united by a hollow rivet or eyelet A', having a removable center point A'$^x$, (dotted lines, Fig. 4,) and either of said arms may be provided with a protractor A$^2$, properly divided by a vernier or scale into degrees of a circle, the center of which is the center of the eyelet. I have illustrated these arms as mounted on a handle D, which may or may not be employed, as desired, and when employed the protractor A$^2$ may be placed thereon. The handle has a flange D', against which either or both of the arms A B may rest, and the said handle has throughout its length an opening D$^2$, into which the attachment E, hereinafter described, may be mounted.

F represents a protractor properly scaled in degrees and having at one side of its center a loop F', through which the arm A passes. A plate F$^2$ is pivotally connected with the protractor F by means of a hollow eyelet or rivet F$^3$, having at one side of its center a loop F$^4$, through which the arm C passes. It will be seen that both arms A and C may freely pass through the loops of the protractor F and its companion plate and that the center F$^3$ will always be at the exact line of crossing at the inner edges of the arms. This form of joint is practical, though for greater accuracy I have shown a preferred form on the arms B and C. This joint consists of a circular or angular termination of the arm C, as shown at C', there being an inwardly-projecting point C$^2$ within the annulus C' and terminating at the edge of the arm B, which projection or point rests exactly on the scale of said arm, regardless of the angle which the arm C is caused to assume with relation to the arm B. This result is accomplished by the manner of connecting the annulus with the arm B. The problem involves a movement of the annulus longitudinally upon the arm B. This might be accomplished by means of a groove or slot B', Fig. 7, a sliding nut B$^2$, mounted therein and dovetailed in the groove, as shown, a screw B$^3$, passing through a semicircular disk B⁴ and through a covering-plate B⁵, which is broken off at the line B⁵ˣ in Fig. 8 to disclose a graduated annulus C', which moves thereunder. The disk or plate B⁴ is a trifle thicker than the annulus C', so as to give freedom of rotation of the annulus between the plate B⁵ and the surface of the arm B, which has a flange B⁶, against which the edge of the annulus bears, its point of contact being one bearing-surface and the circular edge of the semi-disk B⁴ being the other bearing. As before stated, this construction will permit the annulus joint to move longitudinally upon the arm B and will present the point or projection C² at the edge of the arm to closely indicate any division of the scale on the arm regardless of the angle between the two arms. This construction requires a longitudinal slot in the arm B, which has a tendency to weaken the same and cause it to spring or bend too easily. The equatorial edge of the plate B⁴ is removed and formed on the line B⁴ˣ, so as to form a recess for the reception of the projection C² when all three of the arms of the instrument are brought into substantially parallel lines, which occurs when the instrument is packed to occupy a minimum of space, as when not in use.

The preferred manner of connecting the annulus with the arm B is to form said arm of two bars, the one having a groove B' running lengthwise on the inner face of one of the parts. In this case the semi-disk is provided with a rib B² to ride in the groove B', and it and the annulus are arranged between the two parts constituting the arm B, and these are secured to each other in any desirable manner. It is of course understood that a suitable and similar scale or scales is present on each of the arms A, B, and C, E E'ˣ, and such scales may be in divisions to suit the taste or judgment of the manufacturer or the particular purpose for which the instrument is to be used. The scales may be inches and divisions of an inch—as, for example, one-fiftieth—or the scales may be metrical—that is, in accordance with the metric system.

It will be noted that by using the annulus joint at each end of the arm C and by constructing said arm in two or more parts and in such manner that one part may ride upon or within the others all of the arms may be caused to lie in a common horizontal plane when the instrument is placed upon a paper or other surface for use.

A convenient illustrative form of constructing the arm C in two parts is illustrated in Fig. 1 by dotted lines, representing a cross-section on the line *x x*, in which one arm or part has a dovetailed rib riding in a dovetail groove formed in the other part. Any of the well-known forms of sliding joints may be adopted.

It now remains to describe the construction and operation of the attachment, illustrated by dotted lines in Fig. 1 and by full lines in Fig. 6. A stem E, which is adapted to slide in the opening D² of the handle D, has a protractor E' at its end and a bar E² pivoted at E³ to the center of the protractor. The bar E² is supposed to be provided with a scale similar to those on the arms A B C. Now when it is desired to construct lines parallel with and either inside of or outside of the arms A B C the stem is raised and the arm E² swung on its pivot to the desired parallel position. An additional arm or arms Eˣ may be mounted to slide upon the arm E² by means of a loop E'ˣ, whereby lines at right angles to that constructed with the arm E² may be laid off. The attachment is useful at times in triangulating irregular plots. Larger quadrant or sector scales or verniers C'ˣ may be secured at the angles, if desired, as shown at C'ˣ, dotted lines, Fig. 1.

From the foregoing description of the construction and operation of my invention persons skilled in the use of these instruments will readily understand its application. One operation of the instrument can readily be seen by assuming that a surveyor meets with an inaccessible territory consisting of a lake or pond of which he must ascertain either the distance across it on any given line or its area, or both. He need make no plot in either case; but if he does so, both problems are solved by simply adjusting the instrument to the plot and reading the result. From a point on shore the operator will level his field-compass upon some object on the opposite shore and along the line across the obstacle the length of which it is desired to determine. He will again level his compass upon an object at the opposite end of said line, noting the angle formed by the intersection of the two lines of observation leading to the extremities of the line sought to be measured. He will then go to the first point on the line of observation, measuring the distance as he goes, and will fix his compass upon the opposite end of the sought-for line, noting the angle made with the first line of observance. He will then simply adjust the arms of the triangleometer to agree with one of the angles of the line surveyed, and will then slide the third arm of the instrument in accordance with the scale thereon to indicate the length of the first line of observation and will dispose of the third arm at its opposite end to agree with the angle at the intersection of the first line of observation and the desired line, when the third arm will assume the position and indicate the length of the desired line. If he then wishes the area, a simple outward movement of the attachment, Fig. 6, is made until the transverse bar touches the apex opposite and the altitude is recorded upon the shaft E, when a simple mental operation gives the exact area of the triangle. In the plot of any triangle neither side nor angle being given, all these are ascertained and read instantly by adjusting the instrument to the figure, and in any plot of any shape the area is similarly found by laying it off in triangles and reading the results severally and adding them together.

I have not designated the material of which the instrument is to be constructed nor the sizes or thicknesses of the various arms, as these matters are within the selection or judgment of preference of the maker or user.

What I claim as new is—

1. In an instrument of the class described, two arms pivoted upon each other and a third arm mounted pivotally at each end upon each of the two arms, and a protractor located at and movable with each of the pivots of the third arm, substantially as specified.

2. The combination, with a handle, of two arms pivoted to each other and to the handle, and a third arm mounted pivotally and to slide upon the other arms, substantially as specified.

3. The combination, with a handle having a recess, of two arms pivoted to the handle, and a detachable stem having a protractor and a pivoted arm, substantially as specified.

4. The combination, with a handle carrying pivoted arms, of a detachable stem carrying a pivoted arm provided with an arm sliding thereupon and always at a right angle therewith, substantially as specified.

5. The combination of a handle and two arms connected therewith by a hollow eyelet or rivet, substantially as and for the purpose set forth.

6. The combination, with two arms, as A and C, of a protractor provided with an arm-receiving loop and of a companion plate provided with an arm-receiving loop and a hollow eyelet or rivet for uniting the protractor and plate, substantially as specified.

7. A pivotal and sliding joint comprising a longitudinally movable and rotatable annulus and a plate having a rib and means for connecting the plate movably with an arm, substantially as specified.

8. A pivotal and sliding joint comprising a longitudinally movable and rotatable annulus and a semi-disk arranged within the annulus and means for keeping the parts in operative position, substantially as specified.

9. A pivotal and sliding joint comprising one piece with an annulus formed on or attached thereto, a semi-disk arranged within the annulus and retained in connection with and within a groove in the other part, substantially as specified.

10. A pivotal and sliding joint comprising one piece with an annulus, a semi-disk having a rib, and a slotted arm having a groove in one wall of the slot, substantially as specified.

11. A pivotal and sliding and indicating joint comprising one piece with an annulus having an inwardly-projecting point, a slotted arm, and means for retaining the annulus movably within the slot, substantially as specified.

12. A pivotal, sliding, and indicating joint comprising one piece with an annulus having an inwardly-projecting point and a semi-disk having a recess for the reception of the point, substantially as specified.

13. The combination of two arms pivoted to each other and a third arm formed in sliding sections and terminating at each end with a pivotal sliding connection with the two first-mentioned arms, substantially as specified.

14. The combination, with two arms pivoted to each other, of a third arm constructed in overlapping sections and terminating at each end in an annulus arranged to embrace a semi-disk mounted to move longitudinally along the two first-mentioned arms, substantially as specified.

In testimony whereof I affix my signature in presence of two witnesses.

LEE P. WATSON.

Witnesses:
B. F. RADUAGE,
ARCHIE HAMILTON.